United States Patent [19]

Acee, Sr.

[11] Patent Number: 4,781,666

[45] Date of Patent: Nov. 1, 1988

[54] EMERGENCY DRIVE BELT AND METHOD FIELD OF THE INVENTION

[76] Inventor: Acee M. Acee, Sr., Box 241, R.R. 1, Whiteboro, N.Y. 13492

[21] Appl. No.: 106,130

[22] Filed: Oct. 8, 1987

[51] Int. Cl.$^4$ .......................... F16G 3/00; B65D 63/00
[52] U.S. Cl. .................. 474/253; 24/16 PB; 24/17 A; 474/255; 474/256
[58] Field of Search .................. 474/253–258; 24/16 PB, 17 A, 30.5 P

[56] References Cited

U.S. PATENT DOCUMENTS

| | | | |
|---|---|---|---|
| 2,984,119 | 5/1961 | Jenkins, III et al. | 474/255 X |
| 3,748,699 | 7/1973 | Cunningham | 474/256 X |
| 3,841,168 | 10/1974 | Daniels | 474/255 X |
| 4,236,280 | 12/1980 | Kreiseder | 24/17 A X |
| 4,413,380 | 11/1983 | Suzuki | 24/16 PB |

Primary Examiner—Thuy M. Bui
Attorney, Agent, or Firm—Frederick J. McCarthy

[57] ABSTRACT

An emergency drive belt is provided formed of an elongate elastomeric member whose ends are coupled by a resilient plastic strap in the form of an adjustable loop which can be ratcheted to tension the belt device.

7 Claims, 3 Drawing Sheets

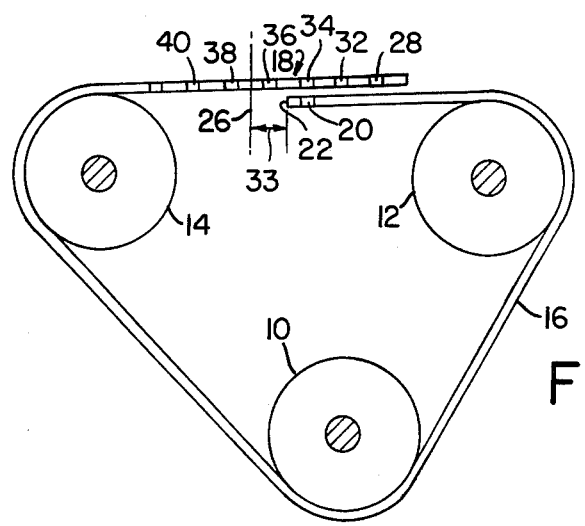
FIG. 1
FIG. 1(a)
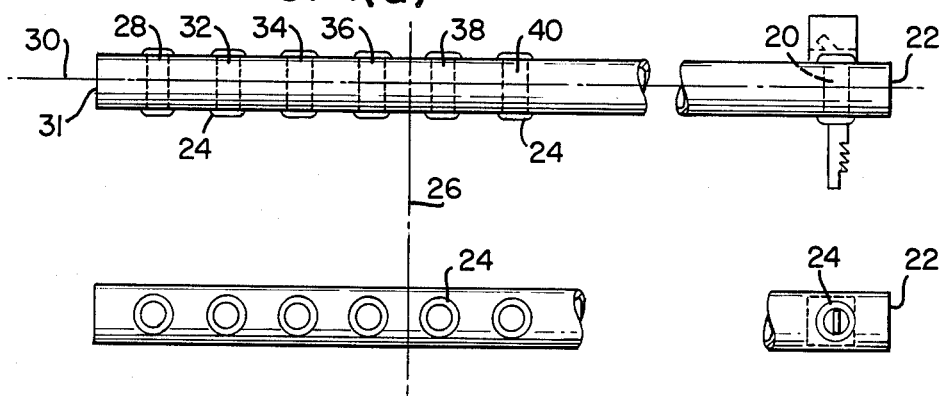
FIG. 1(b)
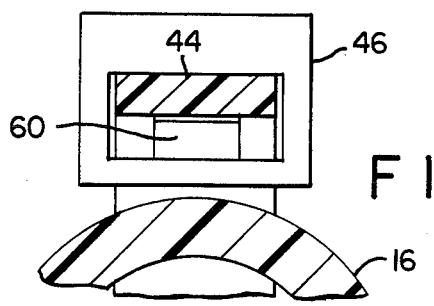
FIG. 3(a)

4,781,666

EMERGENCY DRIVE BELT AND METHOD FIELD OF THE INVENTION

FIELD OF THE INVENTION

The present invention relates to power transmission means, and more particularly to an emergency drive belt particularly for use as a temporary replacement for a ruptured automobile water pump pulley belt.

BACKGROUND OF THE INVENTION

While the automotive drive belts which are presently commercially available are rugged and long lived, it still happens, usually due to infrequent inspection and replacement of the belt, that the belt will rupture and fail while the automobile is being driven. The appropriate thing to do under the circumstances is to discontinue operation of the vehicle until a new drive belt is installed. Even with a replacement belt at hand, various tools and a certain amount of mechanical skill are required in order to effect satisfactory replacement of the belt. Consequently there have been serious efforts directed toward the goal of providing emergency drive belt devices and the like which can be installed more easily than a regular drive belt and which will last at least long enough to reach a service station. A number of patents have been issued directed to such devices for example, U.S. Pat. Nos. 4,336,021, 4,258,582, 3,748,699, 4,279,606, 4,437,849, 3,922,759. The devices described in the aforementioned patents, in general, have provided significant improvements. However, further improvements in the art are desireable, particularly as regards ease of installation, taking into account the high degree of crowding of components which exists under the hoods of most modern automobiles.

SUMMARY OF THE INVENTION

In accordance with the present invention, an emergency replacement drive belt device is provided which can be to be looped around a preselected automotive drive pulley and one or more preselected drive pulleys, e.g. auto fan, water pump pulleys. The emergency drive belt of the present invention comprises a belt-shaped flexible, stretchable resilient member of polymeric material having a trans-axial aperture adjacent one end and a plurality of spaced apart trans-axial apertures extending along the longitudinal axis away from the other end of the belt-shaped flexible member. Coupling means to adjustably connect opposite ends of the belt-shaped flexible member, are provided in the form of an elongated, tough flexible tie, or strap, which is much smaller in length than the stretchable belt-shaped member; the belt-shaped member being substantially more elastic and stretchable than the tie member. The tie member has integral ratchet means, suitably made of the same material as the tie member and, in use, the flexible belt-shaped member is shortened at the end having the plurality of apertures to be slightly less than the length required for a complete loop around a preselected drive pulley and one or more preselected driven pulleys. The tie member is serially threaded through the two apertures which are adjacent respective ends of the shortened flexible belt-shaped member and through the ratchet means to form an adjustable loop coupling the respective ends of the shortened flexible belt-shaped member. The shortened belt-shaped member is looped around the preselected pulleys and tensioned by ratcheting the tie member in the ratchet means.

BRIEF DESCRIPTION OF THE DRAWINGS

FIG. 1 shows, somewhat schematically, an automotive pulley arrangement with the emergency belt device of the present invention being prepared for installation.

FIGS. 1(a) and 1(b) respectively show side and bottom views of the belt component of FIG. 1

FIGS. 3 and 3(a) show a particular coupling arrangement for the emergency belt device of the present invention and FIG. 4 illustrates the procedure for the coupling arrangement of FIG. 3.

DESCRIPTION OF THE PREFERRED EMBODIMENTS

Figure 2:
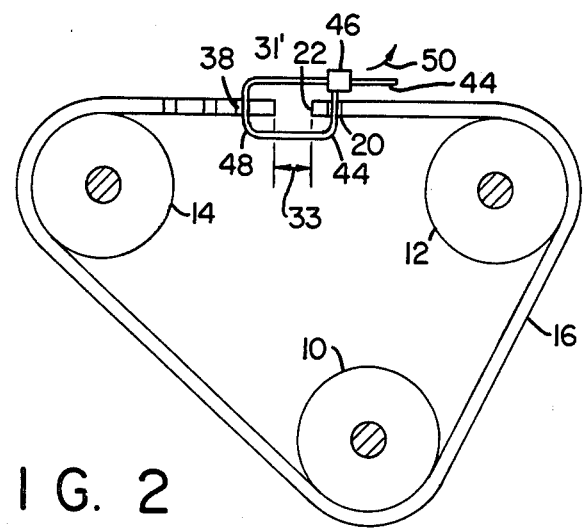
FIG. 2 shows an emergency belt device in accordance with the present invention installed on the pulley arrangement of FIG. 1

With reference to FIG. 1, the schematic configuration of an automotive pulley drive configuration is illustrated comprising motor drive pulley 10, and the driven pulleys, fan pulley 12, and generator pulley 14. An elongated belt-shaped flexible member is shown at 16, suitably made of rubber, synthetic organic polymers or the like, e.g. a synthetic polyester elastomeric sold under the name of HYTREL by E.I. du Pont deNermours & Company and the like. Belt-shaped polymeric member 16 is suitably in the form of a hollow tube or of solid cross section e.g. circular, "V" shaped in cross-section, or other conventional shape. Member 16, which is flexible, and stretchable by hand, is used to replace a ruptured drive belt and is looped around pulleys 10, 12 and 14 as shown in FIG. 1, the initial length of the member 16 being such that its opposite ends overlap as shown at 18 in FIG. 1. With reference to FIGS. 1(a) and 1(b) member 16 has a through, trans-axial aperture 20 spaced inward from its end indicated at 22; aperture 20 passes completely through member 16 and can be provided with a protective metal or plastic grommet 24.

All of the apertures illustrated are transverse to the longitudinal axis 30 of the elastomeric member and lie in the plane of the loop. Elongate elastomeric member 16 is shortened, e.g. by cutting at 26 with a razor blade or a hand clipper so that a space of about ¼ to 3 inches, indicated at 33, exists between the ends of the elastomeric member 16 when in an essentially unstretched condition. The cutting of member 16 does not have to result in precise dimensions of the cut material and can be accomplished in any convenient manner since the opposing ends of the member 16 are not in contact when the device is installed. The distance between the ends of member 16 is not critical in the range of about ¼ to 3 inches and is chosen to take advantage of the spacing between the spaced apertures 28, 32, etc which extend from end 31 along the longitudinal axis 30 of elastomeric member 16. When the length of member 16 has been shortened to accomodate the preselected pulleys 10, 12, 14, by cutting between apertures 36 and 38 leaving a space of about ¼ to 3 inches between its end 22 and the new cut end 31, member 16 as illustrated in FIG. 2, is looped around pulleys 10, 12, 14 in an essentially unstretched condition and a tie member 44 e.g., in the form of a strap of tough, flexible, resilient material having high tensile and compressive strength such as nylon, polyamide plastic, polypropylene and the like is threaded serially through aperture 20 and aperture 38 along the longitudinal axis of member 16 and into enagement with ratchet element 46 suitably made of the same material as tie member 44. An adjustable loop 48 is thus formed which couples the ends 22 and 31' of belt-shaped member 16. Upon ratcheting tie member 44, through ratchet element 46 by pulling in the general direction indicated at 50, tension is easily applied to flexible member 16 and member 16 contacts pulleys 10, 12, 14 with sufficient force to enable pulleys 12 and 14 to be driven from pulley 10.

Figure 3:
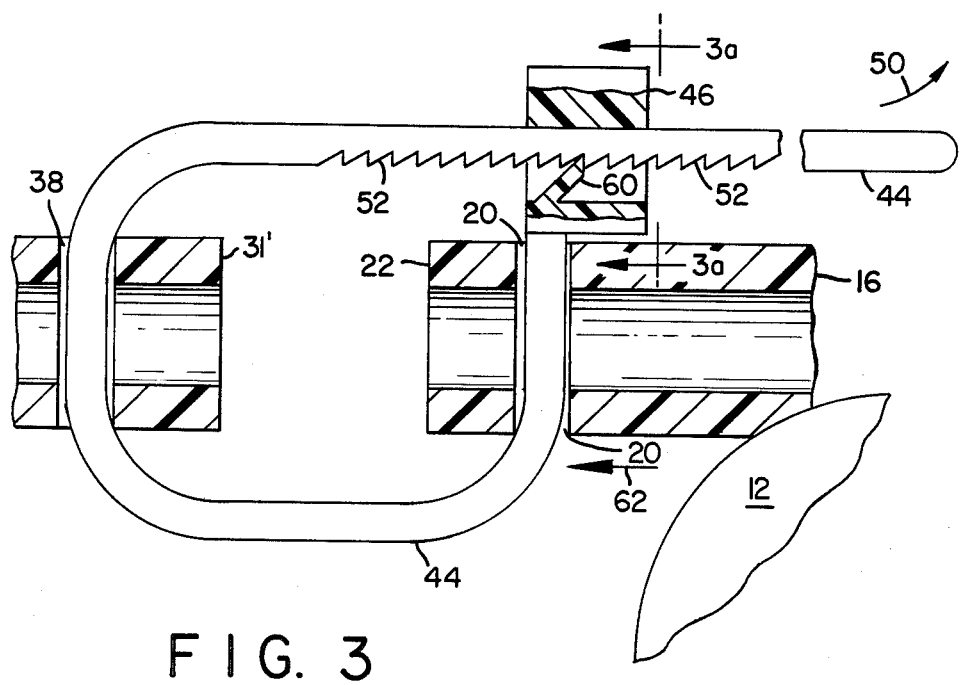
Figure 4:
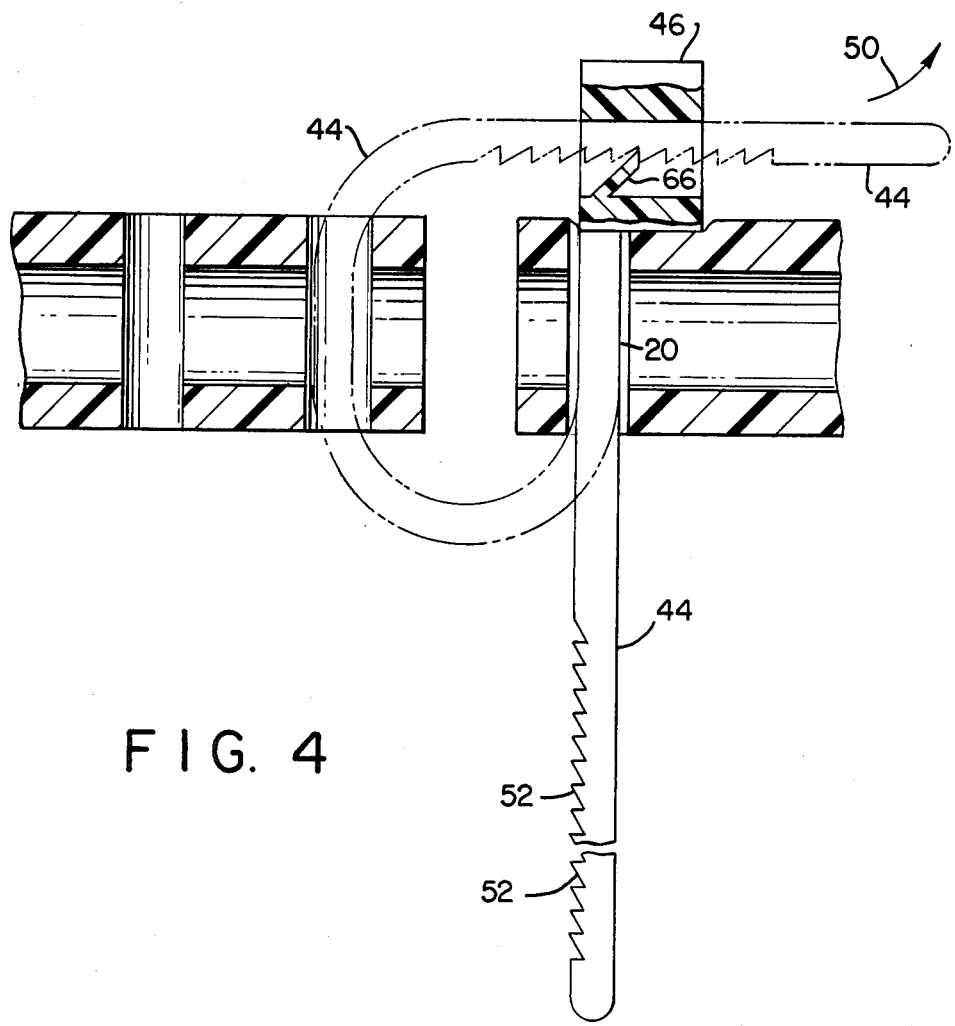

As shown in FIGS. 3, 3(a) and 4, flexible strap 44 is serrated as indicated at 52 and is sufficiently deformable to engage the pawl 60 of ratchet element 46 which is also suitably made from nylon, polyamide plastic, polypropylene, and the like. This type of strap and pawl ratchet arrangement is disclosed in U.S. Pat. No. 3,542,321 for use as a tie for binding a bundle of wires. Other types of ratchet arrangements for strap 44 can be used such as a flat strap, serrated edge, rectangular aperture tie configuration of the type used for trash and leaf bag closures. With reference to FIG. 3 the importance of employing a loop of of tough flexible material "in line" with elastomeric member 16 is illustrated by noting the arrow 62 which represents the impact force to which tie member 44 is subjected upon contact with the pulleys.

In a particular embodiment of the present invention, a hollow rubber tube (¾" O.D., 3/16" I.D.) is used having a length of 4–5 feet. Trans-axial apertures (⅛" diam.) are provided as shown in FIG. 1, starting one inch from the end of the tube and six are provided, one inch apart at the other end. The tube is looped around the drive shaft pulley and the water pump pulley of an automotive engine. The tube can be looped about other pulleys e.g. power-steering, air conditioner, emission control. The tube is cut, using a knife or clipper, apertures to have a length in the unstretched state which loops around the pre-selected pulleys.

A tie and ratchet arrangement of the type shown in FIG. 3 is connected with the tube to provide an adjustable loop. The tie and ratchet arrangement is commercially available as 3M #006228 cable tie. The strap is 1/16 inch thick and about 15 inches long with serrated ridges over about 13 of its length; the ratchet element, integral with the strap, is 5/16 inches wide × ¼ inch × ¼ inch. The adjustable loop is reduced in size by pulling in the strap by hand, to tighten the belt on the pulleys.

The following examples will further illustrate the present invention:

EXAMPLE 1

A test of an emergency drive belt in accordance with the present invention was conducted with a 1977 Lincoln Continental. This automobile has a 460 cu. in. engine with four belts driven from the crank shaft drive for the alternator, air conditioner, water pump, power steerting, and emmission control. The emergency drive belt was used as a replacement to drive the water pump and power steering from the crank shaft drive. The alternator was not driven since the automobile can operate from the battery for several hours at least.

The emergency drive belt was made from a fifty four inch length of gas-line tubing of nylon reinforced rubber having a ¾ inch O.D. and 3/16 inch I.D.

A tie member having an integral ratchet means, of the type shown in FIG. 3 was used with the tubing; the tie member with ratchet was a commercially available 3M plastic (3M #006228) cable tie having a total length of 15 inches. The tie was ¼ inch wide, 5/16 inch thick and was serrated over 13.5 inches of its length. The ratchet element was 5/16 inch wide × ¼ inch × ¼ inch. A series of holes ⅛ inch diameter were made through the tubing at 1 inch intervals from each end of the tubing. The tubing was passed around the above-noted pulleys in the unstretched state and then cut between the second and third holes at one end to provide a length of tubing with ends that were about 1/16 inch apart when passed around the pulleys in the unstretched state. The tie was installed as illustrated in FIG. 4 and pulled tight by hand. The excess portion of the tie extending beyond the ratchet was cut off. The automobile engine was operated from 650 RPM to 3500 RPM and driven at speeds up to 50 MPH for 41 miles over a period of 2 hours 13 minutes. The operation of the automobile was satisfactory in all respects and the emergency drive belt appeared to be in the same condition as when the test was started.

EXAMPLE II

A test of an emergency drive belt in accordance with the present invention was conducted with a 1978 Ford Granada. This automobile has a 250 cu. in. engine with two matched belts in parallel driven from the crank shaft drive for the alternator, power steering and water pump. The emergency drive belt was used as a replacement of both belts to drive the water pump and power steering from the crank shaft drive. The alternator was not driven since the automobile can usually operate from its battery for several hours at least.

The emergency drive belt was made from a fifty four inch length of gas-line tubing of nylon reinforced rubber having ¾ inch O.D. and 3/16 inch I.D.

A tie member having an integral ratchet means, of the type shown in FIG. 3 was used with the tubing; the tie member with ratchet was a commercially available 3M plastic (3M #006228) cable tie having a total length of 15 inches. The tie was ¼ inch wide, 1/16 inch thick and was serrated over 13.5 inches of its length. The ratchet element was 5/16 inch wide × ¼ inch by ¼ inch. A series of holes of ⅛ inch diameter were made through the tubing at 1 inch intervals from each end of the tubing. The tubing was passed around the above-noted pulleys in the unstretched state and then cut between the third and fourth holes at one end to provide a length of tubing with ends that were about two inches apart when passed around the three above-noted pulleys in the unstretched state. The tie was installed as illustrated in FIG. 4 and pulled tight by hand. The excess portion of the tie extending beyond the ratchet was cut off. The automobile engine was operated at 650 RPM over a period of 10 minutes. The operation of the automobile was satisfactory in all respects, demonstrating that both the water pump and power-steering were operable and the emergency drive belt appeared to be in the same condition at the end of the test as when the test was started.

FIG. 4 illustrates an embodiment of the present invention wherein the ratchet element 46 is recessed and is closely and firmly held in the elongate elastomeric member in-line with the single aperture 20 adjacent an end of the elastomeric member, with the tie member 44 extending from the ratchet through the aperture. This embodiment, with the ratchet and tie already correctly oriented, is very easy to install in a very short period of time.

What is claimed is:

1. An emergency drive belt device comprising a belt-shaped flexible and stretchable member of polymeric material, said belt-shaped polymeric member having an aperture spaced closely adjacent to a first end thereof and a plurality of spaced apart apertures extending along the longitudinal axis of the belt-shaped polymeric member away from the other end thereof such that said belt-shaped polymeric member can be shortened by cutting between spaced apart apertures to provide a belt-shaped member length which is slightly less than that which is required to provide a complete loop around a drive pulley and preselected driven pulleys; coupling means comprising a flexible and deformable tie member of substantially lesser length than said belt-shaped polymeric member, said tie member having an integral ratchet means and said tie member being threadable serially through the two apertures which are adjacent respective ends of the belt-shaped polymeric member and through said ratchet means and being engageable therewith to form an adjustable loop coupling the respective ends of said belt-shaped polymeric member, said loop being adjustable to increasingly smaller size by pulling said tie member to increase the portion thereof which passes through said ratchet means and thus increase the tension in the belt-shaped polymeric member when said belt-shaped polymeric member is in-place and looped around, said drive pulley and one or more preselected driven pulleys.

2. An emergency drive belt device in accordance with claim 1 wherein said belt-shaped polymeric member is formed of a hollow tube.

3. An emergency drive belt device in accordance with claim 1 wherein said belt-shaped polymeric member is formed of rubber and is solid with a substantially constant cross-section.

4. An emergency drive belt device in accordance with claim 1 wherein the apertures in the belt-shaped polymeric member are transverse to the longitudinal axis of the belt-shaped polymeric member and lie in the plane loop which is formed when the ends of the belt-shaped polymeric member are coupled by said coupling means.

5. An emergency drive belt device in accordance with claim 1 wherein said tie member is in the form of a serrated strap of polymeric material which is insertably engageable with said ratchet means.

6. An emergency drive belt device in accordance with claim 1 wherein said ratchet means is recessed in said belt-shaped polymeric member in line with the aperture adjacent said first end thereof and the tie member extends from the ratchet means through said aperture.

7. A method for providing an emergency belt device which comprises:
(i) providing a belt-shaped flexible and stretchable member of polymeric material having an aperture spaced closely adjacent to a first end thereof and a plurality of spaced apart apertures extending along the longitudinal axis of the belt-shaped polymeric member away from the other end thereof;
(ii) providing coupling means in the form of a flexible tie member of substantially lesser length than said belt-shaped polymeric member, said tie member having an integral ratchet means;
(iii) removing a portion of the belt-shaped polymeric member at the end opposite its said first end to provide a length which is slightly less than that which is required to provide a complete loop around a preselected drive pulley and one or more preselected driven pulleys;
(iv) looping the shortened belt-shaped polymeric member around said preselected drive and driven pulleys;
(v) threading said tie member serially through the two apertures which are adjacent respective ends of the shortened belt-shaped polymeric member; and
(vi) engaging the threaded tie member with said ratchet means to form an adjustable loop coupling the respective ends of said shortened belt-shaped polymeric member; and
(vii) tensioning the shortened belt-shaped polymeric member on said preselected driving and driven pulleys by pulling said tie member through said ratchet means to decrease the size of the adjustable loop.

* * * * *